April 26, 1927.
H. V. REED
FRICTION CLUTCH
Filed May 15, 1926
1,626,427
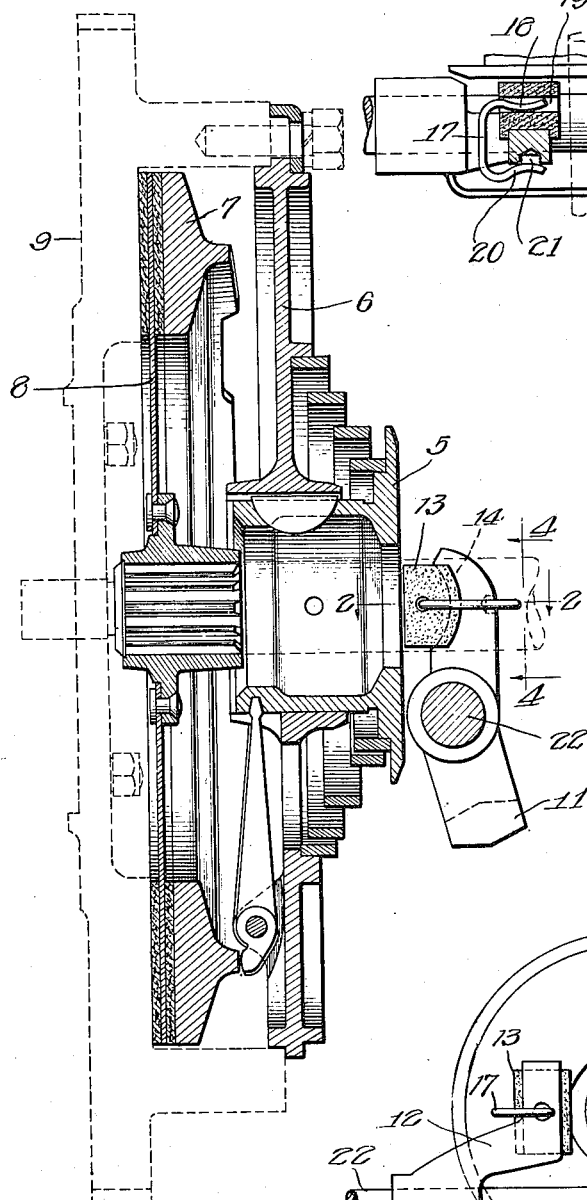
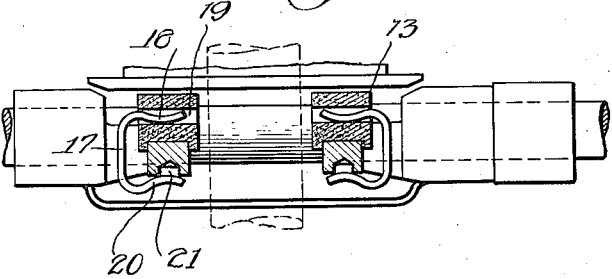
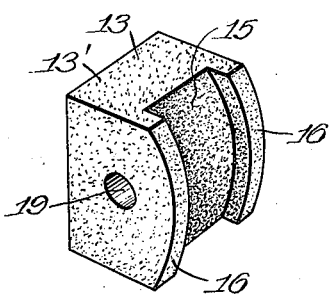
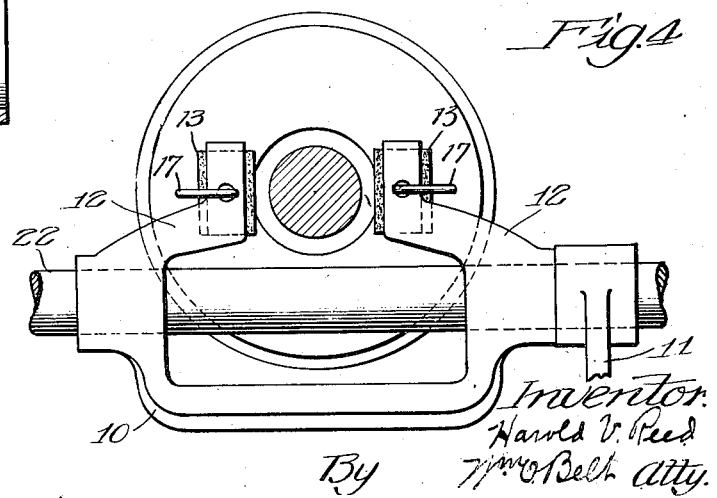
Inventor.
Harold V. Reed
By Wm. O. Belt, Atty.

Patented Apr. 26, 1927.

1,626,427

UNITED STATES PATENT OFFICE.

HAROLD V. REED, OF CHICAGO, ILLINOIS, ASSIGNOR TO THE BORG & BECK COMPANY, OF CHICAGO, ILLINOIS, A CORPORATION OF ILLINOIS.

FRICTION CLUTCH.

Application filed May 15, 1926. Serial No. 109,224.

This invention relates to friction clutches and its object is to simplify and improve the construction by dispensing with the bearing cup and providing the fingers of the clutch release yoke with bearings to engage the release sleeve.

A further object of the invention is to mount the bearings in the fingers in the clutch release yoke so that they will adjust themselves to make efficient contact with the clutch release sleeve and wear evenly and seat firmly and fully in the fingers.

Further objects of the invention will appear in the detail description of a selected embodiment of the invention illustrated in the accompanying drawings in which—

Fig. 1 shows the invention embodied in an automotive friction clutch.

Fig. 2 is a sectional view on the line 2—2 of Fig. 1.

Fig. 3 is an enlarged perspective view of one of the bearings.

Fig. 4 is a sectional view on the line 4—4 of Fig. 1.

Referring to the drawings 5 is the clutch release sleeve, 6 is the cover plate, 7 is the cam ring, 8 is the driven plate and 9 is the fly-wheel mounted on the crank shaft or driving shaft. A clutch release yoke 10 operated by a lever 11 has two fingers 12 which carry the bearings 13. The fingers are each provided with a curved recess 14 which forms a seat for the curved back face 15 of the bearing, this face being located between guide flanges 16 at the sides thereof to engage the sides of the finger. The bearing is held in position on the finger by a spring 17 bent to U form and having one arm 18 seated in an opening 19 in the bearing, and its other arm 20 engaged with a recess 21 in the finger, these arms being bent to make frictional engagement with the parts which they engage.

The front face 13' of the bearing 13 is flat to make contact with the release sleeve 5 and the two bearings have sufficient contact area to operate the release sleeve without the necessity of providing the usual bearing ring. Thus I am enabled to dispense with the relatively large bearing ring as well as with the cup which has heretofore been employed for holding the bearing ring because I have found that the two bearing blocks as herein described will be sufficient and answer all the requirements of a bearing between the yoke and the release sleeve. The yoke swings in an arc on the shaft 22 and the curved seat 14 in each yoke finger and the curved face 15 of each bearing block engaging said seat provide for any movement of the block relative to the finger which may be occasioned by operation of the yoke and sleeve. Thus the bearing block may always have full contact with the sleeve in operation and it may adjust itself relative to the finger for providing this full contact by sliding in the seat 14. This provides for an automatic adjustment of the bearing in its seat in the finger to enable full contact of the bearing with the sleeve under operating conditions.

The bearings 13 are made in the form of blocks of graphite or other suitable antifriction material.

I have shown the invention in a form which I have found satisfactory for practical uses, but there are many varieties of friction clutches and yokes and some changes in the form and construction of parts may be necessary to adapt the invention thereto. Therefore, I reserve the right to make all such changes in the invention as fairly fall within the scope of the following claims.

I claim:

1. In a friction clutch, the combination of a release sleeve, a release yoke having a finger, and a bearing mounted on said finger to engage said sleeve, said bearing being resiliently held in position and automatically adjustable relative to the finger.

2. In a friction clutch, the combination of a release sleeve, a release yoke having a finger, a seat in said finger, a bearing engaging said seat, means restricting movement of said bearing in a transverse direction, and means holding said bearing in said seat and permitting the bearing to adjust itself relative to the seat.

3. In a friction clutch, the combination of a release sleeve, a release yoke having a finger, and a bearing mounted on said finger to engage said sleeve, said bearing being adjustable in one direction relative to the finger and having guide flanges to prevent movement in a transverse direction.

4. In a friction clutch, the combination of a release sleeve, a release yoke having a pair of fingers, bearings mounted on said fingers diametrically of said sleeve to engage the sleeve, said bearings being automatically adjustable in said fingers, and spring holders having portions seated directly in and engaging the bearings and the fingers for yieldingly securing the bearings to the fingers.

5. In a friction clutch, the combination of a release sleeve, a release yoke having a pair of fingers with their ends spaced apart, and separate non-rotatable bearing blocks of antifriction material mounted on said fingers to engage said sleeve, and means restricting movement of said bearing blocks in a transverse direction.

6. In a friction clutch, the combination of a release sleeve, a release yoke having a finger, and a bearing mounted on said finger to engage said sleeve, said finger having a curved back seat, and said bearing having a curved back face movable in said seat, said bearing also having means for restricting it against transverse movement relative to the finger.

HAROLD V. REED.